SEQUENTIAL CIRCUITS
Filed Dec. 18, 1952 2 Sheets-Sheet 1
FIG. 1
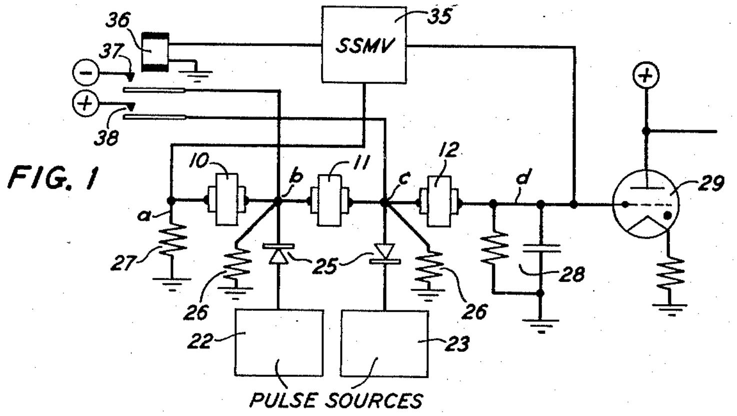
FIG. 2
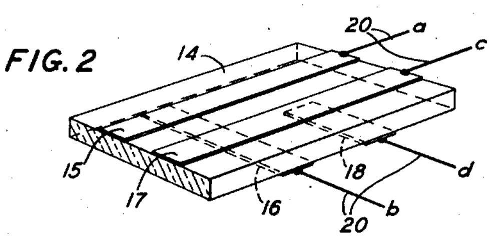
FIG. 3
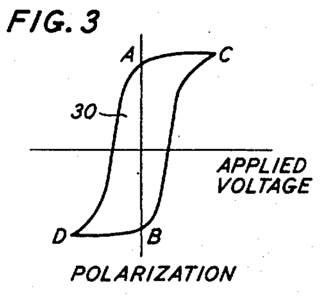
FIG. 4
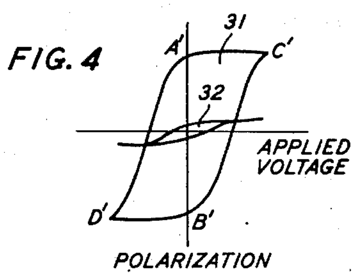
FIG. 5
OPERATIVE OR PROPER SEQUENCE
| CONDITION | CRYSTAL POLARIZATION | OUTPUT |
|---|---|---|
| INITIAL | a (10) + − b (11) − + c (12) + − d | NONE |
| NEG. PULSE AT POINT c | a + − b − + c − + d | NEGATIVE PULSE |
| POS. PULSE AT POINT b | a − + b + − c + − d | POSITIVE PULSE |
INVENTORS A. E. BACHELET
H. PITLIK
BY [signature]
ATTORNEY FIG. 6
INOPERATIVE OR FALSE SEQUENCE
| CONDITION | CRYSTAL POLARIZATION | OUTPUT |
|---|---|---|
| INITIAL | 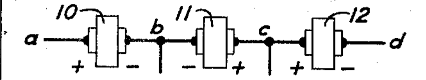 | NONE |
| POS. PULSE AT POINT b | 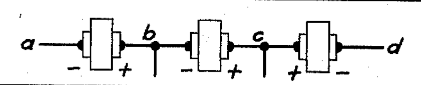 | NONE |
| NEG. PULSE AT POINT c | 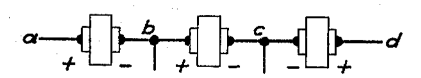 | NEGATIVE PULSE |
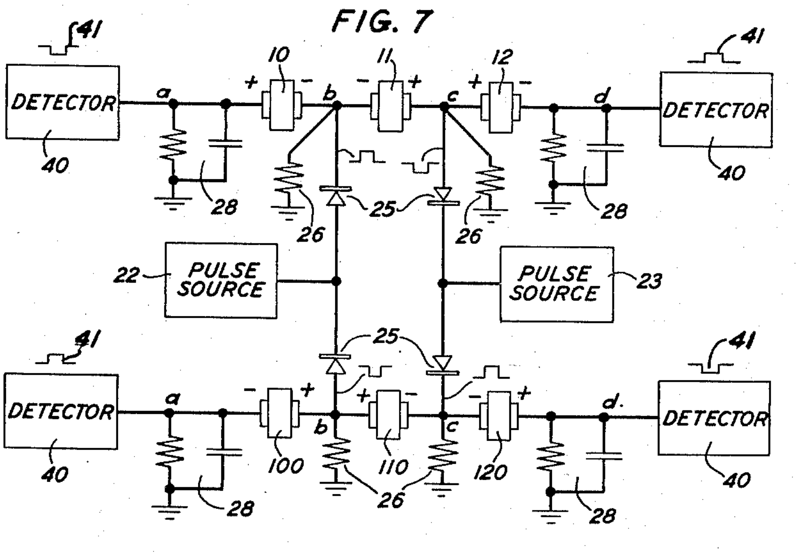
FIG. 7
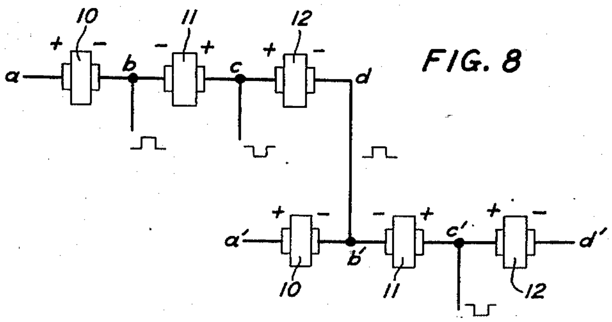
FIG. 8
INVENTORS A. E. BACHELET
H. PITLIK
BY [signature]
ATTORNEY Patented Jan. 12, 1954 2,666,195

UNITED STATES PATENT OFFICE 2,666,195

SEQUENTIAL CIRCUITS

Albert E. Bachelet and Hillel Pitlik, New York, N. Y., assignors to Bell Telephone Laboratories, Incorporated, New York, N. Y., a corporation of New York Application December 18, 1952, Serial No. 326,744

15 Claims. (Cl. 340—168)

This invention relates to electrical circuits and more particularly to such circuits wherein it is desired to recognize particular sequences of pulses.

At various points in a number of electrical or electronic systems, such as computers, counters, telephone systems, etc., it is desirable to be able to ascertain not only the occurrence of a series of pulses but also that they occur in a certain order of time sequence. One application is in digit counters in telephone signalling systems where a digit is represented by a number of pulses counted by a stepping tube of the general type disclosed in Patent 2,575,370, granted November 20, 1951, to M. A. Townsend wherein the discharge is stepped along a row of cathodes. Such a stepping tube may have ten cathodes so that the occurrence of two digits, such as 6 and 7, may be indicated by the stopping of the discharge at the sixth and seventh cathodes. A lead is therefore connected to the sixth and the seventh cathodes and to a sequence circuit. Assume that the number on which subsequent circuitry is to operate is 67. Then the sequence circuit must be operative for the occurrence first of a pulse at the sixth cathode and then for a pulse at the seventh cathode and inoperative for the reverse sequence. Advantagously a delay circuit is interposed between the cathodes and the sequence circuit to assure that pulses are transmitted to the sequence circuit only when the discharge stops or comes to rest on the sixth or seventh cathode and not when it passes across those cathodes while stepping to a higher numbered cathode. Of course, a sequence circuit is not required for a number comprising the repetition of a single digit, such as 66, which may be recognized by other circuitry.

Presently sequence circuits generally employ discharge devices to store the pulses and to advise subsequent circuitry on reception of the proper sequence. Thus in the digit counting circuit just described the appearance of the discharge at cathode 6 transmits a pulse to ionize a gas tube. When this tube breaks down it applies a potential to another gas tube enabling it to ionize on reception of a pulse from cathode 7. This second tube cannot ionize unless the other tube has priorly broken down.

In some instances there may be a considerable period of delay between the occurrences of the pulses of the sequence being recognized. During this time there must be stored in the memory of the sequence circuit the information that some but not all the pulses have been received. When discharge devices are employed, these devices must be drawing power during this entire period.

A general object of this invention is to provide an improved sequence circuit capable of recognizing the occurrence of a particular sequence of various pulses.

Another object of this invention is to enable a sequence circuit to store the memory of the occurrence of an incomplete number of pulses without the provision of standby power.

A further object of this invention is to provide a sequence circuit capable of providing indications on both a proper and a false sequence of pulses.

In one specific illustrative embodiment of this invention wherein the sequential occurrence of but two pulses is to be recognized, three ferroelectric crystals are employed and connected in series. These ferroelectric crystals are memory storage devices comprising a condenser having a dielectric of a ferroelectric material, such as barium titanate, and are described in application Serial No. 254,245, filed November 1, 1951, of J. R. Anderson to which application reference is made for a full description of these crystals. One side of the first crystal is connected, through a resistor, to a reference potential, which may advantageously be ground, and the two pulses are applied between the first and second crystals and between the second and third crystals. When the pulses occur in proper sequence, an output pulse is transmitted by the last crystal to associated circuitry. The particular sequence of pulses and the particular polarity of pulses that it is desired to recognize will determine what the initial polarizations of the crystals will be. A resetting or recycling circuit may be employed to restore the crystals to this condition after each pulse sequence, whether a proper or a false sequence. By applying detection devices connected to the remote terminal of each end crystal or by connecting each end crystal to associated circuitry, the one sequence circuit is able to recognize both the proper and the false sequences.

As the pulses are stored in the ferroelectric crystals, by altering the polarization of the ferroelectric dielectric of the memory storage crystal or condenser, no standby power is needed during the intervals between pulses or until a complete sequence of pulses has been received.

Additionally considerable savings in space can be realized by employing sequence circuits in accordance with this invention.

In accordance with one feature of this invention, a plurality of ferroelectric crystals are connected in a circuit in series and pulses are applied in a sequence to the connections between individual crystals, the crystals being initially polarized so that an output pulse is transmitted to a detecting device or circuit only on the occurrence of a particular sequence. It is a feature of one specific embodiment of this invention that the ferroelectric crystals be initially alternately polarized.

These and various other features of this invention may be completely understood from the following detailed description and the accompanying drawing, in which:

Fig. 1 is a schematic representation of a sequence circuit in accordance with one specific illustrative embodiment of this invention for the recognition of a particular sequence of pulses;

Fig. 2 is a perspective view of a three unit ferroelectric storage element that may be employed in the embodiment of Fig. 1;

Fig. 3 is a graph depicting the hysteresis loop of a single ferroelectric crystal;

Fig. 4 is a graph depicting the hysteresis loops of a pair of ferroelectric crystals in series;

Figs. 5 and 6 are tables indicating the operation of the circuit of Fig. 1 for two possible sequences of pulses;

Fig. 7 is a schematic representation of another illustrative embodiment of this invention wherein the four possible sequences of two pulses of opposite polarities may be recognized; and Fig. 8 is a schematic representation of still another illustrative embodiment of this invention wherein a particular sequence of three pulses may be recognized.

Turning now to the drawing, the embodiment of this invention depicted in Fig. 1 comprises a plurality, which in this embodiment is three, of ferroelectric crystals of the type described in the above-mentioned Anderson application Serial No. 254,245. These crystals 10, 11 and 12 each comprise a dielectric of a ferroelectric material, such as barium titanate, and a plate member positioned on each side of the ferroelectric material. Advantageously all three crystals may employ a single sheet of barium titanate as disclosed in application Serial No. 261,655, filed December 14, 1951, of J. R. Anderson. This is shown in Fig. 2 wherein a single slab 14 of a ferroelectric material, such as barium titanate 0.005 inch thick and one-eighth inch square, has painted or otherwise positioned on its one surface a pair of parallel strip electrodes 15 and 17 about 0.01 inch wide and on its other side a pair of parallel strip electrodes 16 and 18, strip 18 being beneath only strip 17. The electrodes may be of fired silver paste and have lead-in conductors 20 affixed thereto, as by soldering. This single element then constitutes the three ferroelectric crystals or condensers 10, 11 and 12 having terminals designated *a—b*, *b—c*, and *c—d*, respectively.

Referring to Fig. 1, the terminals or points *a*, *b*, *c* and *d* are there indicated. Pulses are applied to points *b* and *c* from pulse sources 22 and 23, which may include stepping tubes, as described above, or any other associated circuitry in the system in which our sequence circuit is employed. For purposes of illustration, the particular embodiment of this invention depicted has been arranged to recognize the sequence of a negative pulse at terminal *c* followed by a positive pulse at terminal *b*. To prevent the appearance of pulses of opposite polarity at these terminals rectifiers or diodes 25 may be positioned between the pulse sources and the points *b* and *c*, high resistances 26 providing the proper reference for diodes 25.

One side of the first crystal 10, i. e., terminal *a*, is connected through a resistance 27 to a direct current operating voltage level, which in this instance is advantageously ground. One side of the last crystal 12, i. e., terminal *d*, is connected to ground through a parallel resistance-capacitance circuit 28 and to some detection device or circuit, which in this instance is a three-element gas tube 29. It is to be understood, however, that the output of this sequence circuit may be applied, as an output pulse, directly to some additional circuit or may itself comprise one of the input pulses of another sequence circuit in accordance with this invention when such circuits are connected in tandem.

In accordance with a feature of this invention, the individual crystals or condensers 10, 11 and 12 have an initial polarization imparted to them to enable them to recognize the desired sequence of pulses. For the specific sequence of pulses discussed above, i. e., a negative pulse at terminal *c* followed by a positive pulse at terminal *b*, the initial polarization is such that the crystals are initially polarized alternately with crystal 10 being polarized positively with respect to terminal *a*. As the operation of our circuit depends upon the polarization changes of the crystals, as described further below with reference to Figs. 5 and 6, a general discussion of the operation of ferroelectric crystals or condensers will be helpful.

The individual polarization loops for the crystals are essentially the same, within the limits of present processing techniques such as described for barium titanate crystals in application Serial No. 303,196, filed August 7, 1952, of J. P. Remeika and application Serial No. 303,197, filed August 7, 1952, of J. R. Anderson and J. P. Remeika, and for purposes of exposition it is sufficient to refer to but one such loop 30, which is shown in Fig. 3. The abscissa of this plot is applied voltage, which is equal to the electric field strength applied to the crystal times its thickness, and the ordinate is the polarization of the crystal, which is equal to the internal charge of the crystal times the area of the electrode plate contingent thereto. As further set forth in the above-mentioned Anderson application Serial No. 254,245, the capacitance of the crystal is determined by the portion of the ferroelectric hysteresis loop 30 being traversed, the capacitance for any segment of the loop being the ratio of change in polarization per unit volume to change in applied electric field. This ratio can be readily seen in Fig. 3 as it is the slope of the hysteresis loop which is large along the steep parts of the segments B to C and A to D and small along the segments C to A and D to B.

When two ferroelectric crystals are connected in series and the polarizing voltage is applied across both of them, the hysteresis loop will be one of the two loops 31 and 32 of Fig. 4. When the two crystals are polarized in the same direction, the effect is the same as if a single crystal having a thicker dielectric were being employed. This is loop 31 and corresponds roughly to the loop for a single ferroelectric element of about double the thickness of the crystals 10, 11 and 12. When, however, the two units are polarized in opposite directions at or substantially at saturation and a voltage is then applied to them in series, the hysteresis loop 32 is effectively a straight line. Were the two crystals precisely identical the loop 32 would be a single line. This results because the two crystals act as a voltage divider. As the crystal traversing the high capacity portion of the hysteresis loop starts towards the saturation voltage required to cause its polarization to change, its capacity increases and the voltage across it decreases with the result that polarization is not changed. For further discussion of the characteristics of two ferroelectric crystals in series reference is made to application Serial No. 286,276, filed May 6, 1952, of J. R. Anderson.

With this background we can now turn to a discussion of the operation of the illustrative embodiment of this invention depicted in Fig. 1. The tables of Figs. 5 and 6 indicate the two possible sequences. Turning first to Fig. 5 and the operative or proper sequence of pulses, as discussed above the initial condition of polarization of the crystals is as indicated by the small plus and minus signs above the crystals in Fig. 5. If we consider that a small plus sign to the left side of a crystal indicates that that crystal is polarized positively then we can state that crystals 10 and 12 are polarized positively and crystal 11 polarized negatively. It should be emphasized that these small plus and minus signs are employed in Figs. 5 and 6 to indicate polarization of the ferroelectric dielectric and not charge on the condenser thus formed.

When a negative pulse is applied to terminal $c$ between crystals 11 and 12, crystal 12 changes its polarity, traversing the segment ADB of its hysteresis loop 30. As the crystal passes through a low impedance state a negative pulse is transmitted to the detection device or associated circuitry. However, as this pulse is negative, it is ignored. The applied negative pulse has no effect on crystals 10 and 11 as these are polarized in series opposition and are thus unaffected, for the reasons further discussed above. On the subsequent appearance of a positive pulse at terminal $b$ crystals 11 and 12, which are now in series and polarized in the same direction, both reverse their polarity and in so doing permit the positive pulse to be transmitted to the detection device or associated circuitry. This positive pulse is recognized or utilized by the detection device or associated circuitry completing the identification of the pulse sequence.

If the positive pulse is applied to terminal $b$ first this pulse wil reverse the polarity of crystal 10 but will have no effect on crystals 11 and 12, as depicted in the table at Fig. 6. The later appearance of a negative pulse will reverse the polarity of crystal 12 allowing it to transmit the negative pulse to the detection device or associated circuitry, and will also reverse the polarity of polarization of crystals 10 and 11. Thus no positive output pulse will be transmitted at any time during this false pulse sequence.

On the completion of either a proper or false pulse sequence it is desirable to reset the crystals to their initial states to enable them to be ready to recognize the next pulse sequence. Any of a number of reset or recycling circuits may be utilized and the particular one depicted in Fig. 1 is to be considered as merely illustrative of those possible. Turning now again to Fig. 1 the appearance of a positive pulse on the output lead triggers a single shot multivibrator circuit 35 causing it to momentarily energize a relay 36 closing its contacts 37 and 38 to apply a negative pulse to point $b$ and a positive pulse to point $c$, respectively. While a relay has been depicted it is to be understood that it merely is demonstrative of one of the numerous possible devices and methods that might be employed to apply the resetting pulses, other devices including nonlinear magnetic coils, tubes, etc.

When the crystals are polarized by a false sequence of pulses no positive output pulse appears on the conclusion of the sequence. However, consideration of Figs. 5 and 6 will show that the same resetting pulses may be employed and that the conclusion of the false sequence causes a negative pulse to be transmitted back through crystal 10 to ground. The single shot multivibrator circuit 35 is therefore connected to the terminal $a$ in such a manner as to be triggered by the application thereto from terminal $a$ of a negative pulse.

Therefore if desired a circuit in accordance with our invention may be utilized to detect and indicate the occurrence of either sequence of pulses, a detection device being connected to terminal $d$ and operable on reception therefrom of a positive pulse to indicate the one sequence and a second detection device being connected to terminal $a$ and operable on reception therefrom of a negative pulse to indicate the other sequence of the two pulses.

Our invention is of course not to be considered as limited to the recognition of the sequence of but two pulses or to recognition of the sequence of only particular polarity pulses. Thus if the initial polarizations of each of crystals 10, 11 and 12 are reversed the circuit will recognize either sequence of a negative pulse at terminal $b$ and a positive pulse at terminal $c$. In such a case the output will be a positive pulse at terminal $a$ if the negative pulse is first applied at terminal $b$ and a negative pulse at terminal $d$ if the positive pulse is first applied at terminal $c$. Fig. 7 depicts a specific embodiment of this invention wherein two sequence circuits are combined so that the generation of either a positive or a negative pulse from either pulse source 22 or 23 followed by a pulse of the opposite polarity from the other pulse source will be recognized. Four detectors 40 are shown and the output pulses 41 on which they are operated are also illustrated to facilitate an appreciation of the figure; the input pulses to the terminals $b$ and $c$ of the two groups of crystals are also shown. The initial polarities of the crystals 10, 11 and 12 are the same as for the embodiment of Fig. 1 and, as just discussed above, the initial polarities of the crystals 100, 110 and 120 are the reverse, as indicated by the small plus and minus signs adjacent each crystal.

If it is desired to recognize the sequence of three pulses terminal $d$ of the embodiment of Fig. 1 can be connected to terminal $b'$ of a second similar circuit if the ferroelectric crystals of the second circuit have initially the same polarizations as shown in Fig. 8. This combination will then identify, by producing a positive output pulse at terminal $d'$, the sequence of a negative pulse, applied to terminal $c'$, a negative pulse, applied at terminal $c$, and a positive pulse, applied at terminal $b$. Longer sequences of pulses may be recognized by circuits in accordance with our invention by employing a number of groups of three ferro-electric crystals in series, the groups being connected in tandem as depicted in Fig. 8.

It is believed that the recognition of other possible combinations of sequences and polarity of pulses by sequence circuits in accordance with the teachings of this invention will be apparent to those skilled in the art. Thus it is to be understood that the above-described arrangements are merely illustrative of the application of the principles of this invention and that this invention is not limited to the particular initial polarizations of the ferroelectric crystals, the number of crystals or the sequence or polarity of pulses. Numerous other arrangements incorporating the teachings of this invention may be devised by those skilled in the art without departing from the spirit and the scope of the invention.

What is claimed is:

1. A circuit for recognizing a particular sequence of pulses of particular polarities comprising a plurality of ferroelectric crystals connected in series, the initial polarizations of said crystals being determined by the particular sequence of pulses to be recognized, means for applying said pulses sequentially each to one connection between two of said crystals, and means for receiving an output pulse from one of the end crystals in said series on completion of said sequence.

2. A circuit in accordance with claim 1 wherein said crystals are initially alternately polarized.

3. A circuit for recognizing a particular sequence of two pulses of particular polarities comprising three condensers connected in series, each of said condensers comprising a dielectric of a ferroelectric material polarized initially in accordance with the sequence of pulses to be recognized, means for applying a pulse between the first and second of said condensers, means for applying a pulse between the second and third of said condensers, and means for receiving an output pulse from one of the end condensers in said series on completion of said sequence.

4. A circuit in accordance with claim 3 comprising also means for receiving an output pulse from the other of said end condensers on completion of a sequence reverse to said particular sequence.

5. A circuit in accordance with claim 4 further comprising means for resetting said condensers to their initial polarizations on completion of either of said sequences.

6. A circuit for recognizing a particular sequence of two pulses of particular polarities comprising three ferroelectric crystals connected in series and initially alternately polarized, means for applying a pulse between the first and second of said crystals, means for applying a pulse between the second and third of said crystals, and detector means for receiving an output pulse from one of the end crystals on completion of said particular sequence.

7. A circuit for recognizing sequences of two pulses of particular polarities comprising three ferroelectric crystals connected in series and initially alternately polarized, means for applying a pulse between the first and second of said crystals, means for applying a pulse between the second and third of said crystals, detector means connected to said first crystal for receiving an output pulse therefrom on completion of one sequence of said two pulses, and detector means connected to said third crystal for receiving an output pulse therefrom on completion of the opposite sequence.

8. A circuit in accordance with claim 7 further comprising means for resetting said crystals to their initial polarization on completion of either sequence of pulses.

9. A circuit for recognizing a sequence of pulses of particular polarities comprising a plurality of condensers connected in series, each of said condensers comprising a dielectric of a ferroelectric material and said dielectrics being initially alternately polarized, means applying a pulse between each adjacent pair of condensers, and means responsive to a pulse from the last of said condensers in said series for recognizing the completion of said sequence.

10. A circuit in accordance with claim 9 comprising further means for resetting said dielectrics to their initial polarizations.

11. A circuit for recognizing sequences of pulses comprising a first plurality of condensers connected in series, a second plurality of condensers connected in series, each of said condensers comprising a dielectric of a ferro-electric material and said dielectrics in each series being initially alternately polarized, means applying pulses between adjacent condensers in each series, and means connected to the end condensers in each series for recognizing the completion of a particular series of pulses.

12. A circuit for recognizing sequences of pulses comprising a first group of three ferroelectric crystals connected in series and initially alternately polarized, a second group of three ferroelectric crystals connected in series and initially alternately polarized, the polarizations of said second group of crystals being initially the reverse of that of said first group, means for applying pulses between said crystals of said groups, and detector means connected to an end crystal of each group for recognizing the occurrence of the same sequence of pulses but of opposite polarities.

13. A circuit in accordance with claim 12 comprising further second detector means connected to the other end crystal of each group for recognizing the occurrence of the reverse sequence of pulses of opposite polarities.

14. A circuit for recognizing the occurrence of the sequence of at least three pulses comprising a first group of three ferroelectric crystals initially alternately polarized, a second group of three ferroelectric crystals initially alternately polarized, means for applying the first two pulses between said first and second and said second and third crystals of said first group, means for applying the third pulse to one connection between two of said crystals of said second group, and means connecting said third crystal of said first group to the other connection between two of said crystals of said second group.

15. A circuit for recognizing the occurrence of a sequence of pulses comprising a first group of $n$ ferroelectric crystals initially alternately polarized, at least one other group of ferroelectric crystals initially alternately polarized, means for applying $n—1$ pulses to the connections between pairs of said $n$ crystals of said first group, means for applying at least one pulse to a connection between ferroelectric crystals of said other group, and means connecting the last of said crystals of said first group to a connection between ferroelectric crystals of said other group.

ALBERT E. BACHELET.
HILLEL PITLIK.

No references cited.